(12) United States Patent
Rose et al.

(10) Patent No.: US 9,818,422 B2
(45) Date of Patent: Nov. 14, 2017

(54) METHOD AND APPARATUS FOR LAYERED COMPRESSION OF MULTIMEDIA SIGNALS FOR STORAGE AND TRANSMISSION OVER HETEROGENEOUS NETWORKS

(71) Applicant: THE REGENTS OF THE UNIVERSITY OF CALIFORNIA, Oakland, CA (US)

(72) Inventors: Kenneth Rose, Ojai, CA (US); Tejaswi Nanjundaswamy, Goleta, CA (US); Kumar Bhargav Viswanatha, San Diego, CA (US); Emrah Akyol, Los Angeles, CA (US)

(73) Assignee: The Regents of the University of California, Oakland, CA (US)

( * ) Notice: Subject to any disclaimer, the term of this patent is extended or adjusted under 35 U.S.C. 154(b) by 363 days.

(21) Appl. No.: 14/473,586

(22) Filed: Aug. 29, 2014

(65) Prior Publication Data
US 2015/0063445 A1 Mar. 5, 2015

Related U.S. Application Data

(60) Provisional application No. 61/872,292, filed on Aug. 30, 2013.

(51) Int. Cl.
*H04N 19/124* (2014.01)
*H04N 19/36* (2014.01)
(Continued)

(52) U.S. Cl.
CPC ............ *G10L 19/24* (2013.01); *H04N 19/30* (2014.11)

(58) Field of Classification Search
USPC ........................................................ 375/240
See application file for complete search history.

(56) References Cited

U.S. PATENT DOCUMENTS 5,150,209 A * 9/1992 Baker ..................... G06T 9/008
375/240.02
5,307,163 A * 4/1994 Hatano ................ H04N 19/176
375/240.12
(Continued)

OTHER PUBLICATIONS

Ohm, J., "Advances in Scalable Video Coding", Proceedings of the IEEE, Jan. 2005, pp. 42-56, vol. 93, No. 1.
(Continued)

*Primary Examiner* — Mohammed Rahaman
*Assistant Examiner* — Asmamaw G Tarko
(74) *Attorney, Agent, or Firm* — Gates & Cooper LLP

(57) ABSTRACT

A method and apparatus provide the ability to code signals in a layered manner for compression and networking applications. The solution involves a relaxed hierarchical structure of layers, wherein only an optimal subset of information from lower quality levels is transmitted to higher level decoders. This framework is complemented with a design method to optimize system parameters. Specialization may include techniques for employing irregular quantizers and/or estimation theoretic optimal parameter selection and/or content specific optimization (e.g., exploiting harmonic structure in audio, adaptive transform coding and enhanced motion compensated prediction for video) and/or optimization of the structure of the layers, where the potential of exploiting all the common information is realized to improve overall system performance for that application. One specific technique provides improved compression of signals with multiple quality levels with or without prediction. Another specific technique provides improved compression of signals with multiple heterogeneous quality-levels with or without prediction.

20 Claims, 10 Drawing Sheets

(51) Int. Cl.
G10L 19/24 (2013.01)
H04N 19/30 (2014.01)

(56) References Cited

U.S. PATENT DOCUMENTS

| | | | | |
|---|---|---|---|---|
| 6,907,070 | B2* | 6/2005 | Wu | H04N 19/34 375/240.12 |
| 7,454,327 | B1* | 11/2008 | Neubauer | G10L 19/018 375/146 |
| 7,859,442 | B2* | 12/2010 | Daniels | G04F 10/005 341/143 |
| 2007/0013561 | A1* | 1/2007 | Xu | H03M 7/30 341/50 |
| 2008/0211901 | A1* | 9/2008 | Civanlar | H04N 7/152 348/14.09 |
| 2009/0091485 | A1* | 4/2009 | Daniels | G04F 10/005 341/143 |
| 2009/0175333 | A1* | 7/2009 | Hsiang | H04N 19/63 375/240.12 |
| 2009/0295905 | A1* | 12/2009 | Civanlar | H04L 12/4604 348/14.09 |
| 2010/0166082 | A1* | 7/2010 | Kao | H04N 19/139 375/240.26 |
| 2011/0310978 | A1* | 12/2011 | Wu | H04N 19/44 375/240.25 |
| 2013/0101015 | A1* | 4/2013 | He | H04N 21/234327 375/240.02 |
| 2014/0010294 | A1* | 1/2014 | Ye | H04N 19/00424 375/240.12 |
| 2014/0119441 | A1* | 5/2014 | Lee | H04N 19/11 375/240.12 |

OTHER PUBLICATIONS

Schwarz, H., et al., "Overview of the Scalable Video Coding Extension of the H.264/SVC Standard", IEEE Transactions on Circuits and Systems for Video Technology, Sep. 2007, pp. 1103-1120, vol. 17, No. 9.
Painter, T., et al., "Perceptual Coding of Digital Audio", Proceedings of the IEEE, Apr. 2000, pp. 451-513, vol. 88, No. 4.
Rose, K., et al., "Toward Optimality in Scalable Predictive Coding", IEEE Transactions on Image Processing, Jul. 2001, pp. 965-976, vol. 10, No. 7.
Viswanatha, K., et al., "A Strictly Improved Achievable Region for Multiple Descriptions Using Combinatorial Message Sharing", Proc. IEEE Information Theory Workshop, Oct. 2011.
Aggarwal, A., et al., "A Trellis-Based Optimal Parameter Value Selection for Audio Coding", IEEE Transactions on Audio, Speech, and Language Processing, Mar. 2006, pp. 623-633, vol. 14, No. 2.
Viswanatha, K, et al., "On Common Information and the Encoding of Sources that are Not Successively Refinable", Proc. IEEE Information Theory Workshop (ITW), Sep. 2012.
Sinha, D., et al., "The Perceptual Audio Coder (PAC)," The Digital Signal Processing Handbook, 1998.
ISO/IEC JTC1/SC29 13818-7:1997(E), "Information Technology—Generic coding of moving pictures and associated audio," International Standard, 1997.
ISO/IEC JTC1/SC29 14496-3:2005, "Information technology—Coding of audio-visual objects—part 3: audio—subpart 4: general audio coding," International Standard, 2005.
ISO/IEC JTC1/SC29 11172-3:1992, "Information technology—Coding of moving pictures and associated audio for digital storage media at up to about 1.5 mbps," 1992.
Fielder, L., et al., "AC-2 and AC-3: Low-Complexity Transform-Based Audio Coding", Collected Papers on Digital Audio Bit-Rate Reduction, Audio Eng. Soc, pp. 54-72, 1996.
Akagiri, K., et al., "Sony Systems", The Digital Signal Processing Handbook, 1998, pp. 43-1-43-20.
Brandenburg, K., et al., ""NMR" and "Masking Flag": Evaluation of Quality Using Perceptual Criteria," Proc. 11th International Conference, Aud. Eng. Soc, 1992, pp. 169-179.
Grill, B., "A Bit Rate Scalable Perceptual Coder for MPEG-4 Audio", Proc. 103th Conv. Aud. Eng. Soc, Sep. 1997, Paper 4620, pp. 1-20.
Equitz, W.H.R., et al., "Successive Refinement of Information", IEEE Transactions on Information Theory, Mar. 1991, pp. 269-275, vol. 37, No. 2.
Nitadori, K., "Statistical Analysis of ΔPCM", Electron. Commun. in Japan, Feb. 1965, pp. 17-26, vol. 48.
Paez, M.D., et al., "Minimum Mean-Squared-Error Quantization in Speech PCM and DPCM Systems", IEEE Transactions on Communications, Apr. 1972, pp. 225-230.
Ravelli, E., et al., "Joint Optimization of Base and Enhancement Layers in Scalable Audio Coding", IEEE Transactions on Audio, Speech, and Language Processing, Apr. 2013, pp. 711-724, vol. 21, No. 4.
Gray, R.M., et al., "Source Coding for a Simple Network", The Bell Systems Technical Journal, Nov. 1974, pp. 1681-1721, vol. 53, No. 9.
Wyner, A., "The Common Information of Two Dependent Random Variables", IEEE Transactions on Information Theory, Mar. 1975, pp. 163-179, vol. IT-21, No. 2.
Nanjundaswamy, T., et al., "Cascaded Long Term Prediction for Enhanced Compression of Polyphonic Audio Signals", IEEE/ACM Transactions on Audio, Speech and Language Processing, Mar. 2014, pp. 697-710, vol. 22, No. 3.
Melkote, V., et al., "Trellis-Based Approaches to Rate-Distortion Optimized Audio Encoding", IEEE Transactions on Audio, Speech, and Language Processing, Feb. 2010, pp. 330-341, vol. 18, No. 2.
Viswanatha, K., et al., "Combinatorial Message Sharing for a Refined Multiple Descriptions Achievable Region", Proc. IEEE International Symposium on Information Theory (ISIT), Aug. 2011, pp. 1312-1316.

\* cited by examiner

METHOD AND APPARATUS FOR LAYERED COMPRESSION OF MULTIMEDIA SIGNALS FOR STORAGE AND TRANSMISSION OVER HETEROGENEOUS NETWORKS

CROSS-REFERENCE TO RELATED APPLICATIONS

This application claims the benefit under 35 U.S.C. Section 119(e) of the following commonly-assigned U.S. provisional patent application(s), which is/are incorporated by reference herein:

Provisional Application Ser. No. 61/872,292, filed on Aug. 30, 2013, by Kenneth Rose, Tejaswi Nanjundaswamy, Kumar Bhargav Viswanatha and Emrah Akyol, entitled "Layered Compression of Multimedia Signals for Storage and Transmission over Heterogeneous Networks".

STATEMENT REGARDING FEDERALLY SPONSORED RESEARCH AND DEVELOPMENT

This invention was made with Government support awarded by the National Science Foundation (NSF) under Grant No. CCF-1016861/An Integrated Framework for Distributed Source Coding and Dispersive Information Routing and Grant No. CCF-1320599/The Common Information Framework and Optimal Coding for Layered Storage and Transmission of Audio Signals. The Government has certain rights in this invention.

BACKGROUND OF THE INVENTION

1. Field of the Invention

The present invention relates generally to techniques for coding and decoding of digital multimedia signals. More specifically, it relates to improved techniques for layered coding.

2. Description of the Related Art (Note: This application references a number of different publications as indicated throughout the specification by one or more reference numbers within brackets, e.g., [x]. A list of these different publications ordered according to these reference numbers can be found below in the section entitled "References." Each of these publications is incorporated by reference herein.)

A growing number of diverse data consumption devices (e.g., smartphones, tablets, smart-TVs, PCs) access shared sources of multimedia content over networks of time varying bandwidth and latency. In particular, the same content is delivered to various users at different data rates and quality levels. Obviously, different quality versions of a signal share a substantial amount of common information, whose exploitation is critical to ensure efficient use of resources for storage and transmission across the network. The simplest but highly wasteful approach is to store and transmit independent copies of the signal at different quality levels. A known alternative approach has each consecutive quality level subsume and refine the information transmitted in lower levels. This rigid hierarchical structure, popularly known as scalable coding, is widely recognized to incur significant quality loss, compared to individually encoded copies, and hence has not been adopted by most multimedia content providers.

To better understand the shortcomings of the prior art, some background information regarding prior art compression and networking technologies and, in particular scalable coding technology is provided.

BACKGROUND

Technological advances ranging from multi-gigabit high-speed internet to wireless communication and mobile, limited resource receivers, have created an extremely heterogeneous network scenario with data consumption devices of highly diverse decoding and display capabilities, all accessing the same content over networks of time varying bandwidth and latency. An example of consumer-oriented network 100 of content providers and distributors 101 is illustrated in FIG. 1, wherein typical devices such as a home theater system 102, internet connected TV 103, tablet PC 104, smartphone 105, and laptop PC 106, consume the same content from the content providers and distributors 101. Similar settings and heterogeneous networks also arise in a broad variety of scientific, defense and medical applications involving extensive data collection and distribution. High-tech industries with applications and products operating under these conditions include consumer oriented content providers such as large scale multimedia distributors Apple, Amazon, Google and Netflix; ESPN and other TV programming providers who specialize in live TV/event broadcasting; video and audio conferencing solution providers such as Cisco and Citrix.

The primary challenge is to maintain optimal signal quality for a wide variety of users, while ensuring efficient use of resources for storage and transmission across the network. This has proven to be a formidable problem, where ad hoc approaches have produced unsatisfactory, highly suboptimal performance. One main difficulty is due to large variations in device capabilities and network conditions. For example, the requirements of individual users could vary significantly with respect to data rates, video and audio spatial or temporal resolution, dynamic range per sample, number of channels and views, all depending on the network conditions and user preferences. Various approaches have been proposed to address this challenge in the past, but the fact remains that the most widely used paradigm still consists of storing and transmitting independent different copies of the signal for every type of user the provider serves. This solution is highly wasteful in resources and results in extremely poor scalability. An alternative approach is to transcode (decode and re-encode) the signal in real-time to cater to the requirements of a user or capacity of network links. This approach incurs costs in terms of delay, complexity and reconstruction quality, and is not commonly used in large-scale content distribution systems.

Scalable Coding

The field of scalable coding has evolved over the past few decades, specifically motivated by the above challenges in multimedia content distribution. The objective of scalable coding is to generate layered bitstreams, wherein a base layer provides a coarse quality reconstruction and successive layers refine the quality, incrementally. Depending on the network, channel and user constraints, a suitable number of layers are transmitted and decoded, yielding a prescribed quality level. FIG. 2 illustrates the two quality level conventional scalable coder 200. The input signal 201, is encoded in 202 to generate two bitstreams, $R_{12}$ 203, which is sent to both decoders, and $R_2$ 204, which is sent only to the second decoder. The first decoder 205 generates the base level reconstructed signal 206 and the second decoder 207 generates the enhancement level reconstructed signal 208. The scalable coding structure is inspired by the classical communication 'broadcast' scenario wherein the transmitter simply broadcasts all the bits and receivers manage to decode a subset of the (more significant) bits, depending on their channel conditions. The assumption underlying this structure is that a user with a better channel must always receive all the base layer bits that were necessary to generate the base level reconstructed signal, which are then complemented by the enhancement layer bits. A review of scalable coding can be found in [1], [2]. Scalable coding has been an integral part of both the MPEG advanced audio coding (AAC) [3], [4] and MPEG advanced video coding (AVC) [5] standards. However, it is widely recognized that there is an inherent loss due to the scalable coding paradigm, in the sense that such layered coding often leads to significant degradation in quality compared to individually encoded copies (i.e., non-scalable coding at the same rate). Consequently, most content providers resort to the straightforward approach of encoding multiple copies of the signal, each tailored to a specific expected operating condition. As a simple illustrative example, one may consider a practical scenario in which a content provider offers a music streaming service at two quality levels, and is committed to provide the best possible quality at both the bit rates. As the conventional scalable coder suffers from an inherent loss at one of the layers, the alternative is to store two different versions of the music signal, one at each rate. Even in this over-simplified scenario, the implication is the need to significantly expand the data center resources. Moreover, if a real-time music event is broadcast to multiple users with differing requirements, then additional strain is imposed on the network where many intermediate links must carry both versions of the signal. The situation is exacerbated when there are several bit rates to be supported, as well as scalability in other dimensions, e.g., in the number of audio channels (mono for Bluetooth, stereo for mobile player, 5.1 for home theater).

Scalable Audio Coding

The important special case of scalable coding of audio signals is described below to the extent needed to appreciate the impact of above shortcoming. Most standard audio coders transform overlapping segments of the audio signal into the frequency domain, and encode the frequency content with the objective of minimizing a perceptually motivated distortion measure. The typical perceptual distortion measure is based on a psycho-acoustic masking threshold, which indicates the noise energy level that can be tolerated in different bands of frequency content. Examples for such coders include MPEG MP3[6], MPEG AAC [3, 4], Dolby AC3 [7], Sony ATRAC [8] and Lucent PAC [9]. The MPEG AAC coder, in particular, groups transform domain coefficients into bands, so that all coefficients of a band are quantized using a scaled version of a generic quantizer, and entropy-encodes the quantized coefficients using one of the available Huffman codebooks (HCB). The scaling factor (SF) of the quantizer directly controls the distortion, while entropy coding directly controls the rate in each band. Perceptual optimization is performed by minimizing the distortion measure, typically the maximum quantization noise to masking threshold ratio (MNMR) [10], over all frequency bands of all frames. The AAC encoder's tradeoff optimization problem is that of selecting the SF and HCB parameters to minimize the perceptual distortion for a given rate constraint, or minimize the rate given a distortion constraint. As the AAC standard only dictates the bitstream syntax and decoder, numerous encoder optimization techniques have been proposed. A thorough review of audio compression techniques can be found in [2].

As noted earlier, applications with dynamic channel conditions and diverse user capacities have motivated scalable coding with layered bit-stream structure, such that the base layer provides a coarse quality reconstruction, while the additional layers provide incremental improvement in quality. MPEG has standardized a scalable coder as an extension of basic AAC [11], so that its advantages as a perceptual audio coder are retained. An illustration of the scalable audio encoder 202 is shown in FIG. 3. Base layer coding to generate the base level reconstructed signal is performed by a non-scalable AAC coder, where the input audio signal 201 is divided into frames, each frame is transformed to the frequency domain in 300, and then the SFs and HCBs for the transform coefficients are determined by the quantization and coding module 301 to generate the base layer bitstream 302. The coarse base level reconstructed coefficients 303 are subtracted from the original transform coefficients to generate the spectral representation of the base level reconstruction error 304. The finer resolution SFs and HCBs for this error spectrum are then determined by another quantization and coding module 305 which generates the enhancement layer bitstream 306. The quantization and coding at the enhancement layer is essentially performed by applying a standard non-scalable AAC coder to the reconstruction error. The masking thresholds required for NMR calculation are provided by the psychoacoustic model 307. Note that additional enhancement layers can be included in this scheme in a straightforward manner. In theory, such a multi-stage quantization and coding scheme can be optimal only if, under the given distortion measure, the signal is a so called successively refinable source (as defined by conditions given in [12]). The audio signal is well modeled by the Laplacian distribution [13], [14], and this distribution is known to not be successively refinable under NMR, thus scalable coding is observed to cause significant loss in optimality.

If encoded independently, the base layer can achieve operational rate-distortion optimality (i.e., minimal distortion for a given rate constraint). However, it is widely known that the enhancement quality level suffers significant loss compared to direct encoding at the same sum rate. Prior work, [15], demonstrated that appropriate joint optimization of parameters in all layers, enables effective control of the tradeoff between performances at different quality levels. Experimental results from that work confirm that when base quality level performance of a standard scalable coder matches that of a non-scalable coder operating at the same rate, then the enhancement quality level distortion can be up to 2.4 dB worse than the distortion achieved by a non-scalable coder at the same cumulative rate.

Thus, the critical shortcomings of conventional scalable coding, coupled with the considerable challenges in the field, form a compelling motivation to revisit the problem at its most fundamental level, in order to develop a truly optimal solution.

SUMMARY OF THE INVENTION

The present invention provides a method and apparatus for optimal joint layered coding at multiple quality levels. The rigid hierarchical structure imposed on the bitstream of different layers is the primary drawback of the conventional scalable coder. Embodiments of the invention overcome this drawback with a fundamental shift in strategy, wherein only a subset of the bits that are sent to the base receiver are routed to a high-end receiver. This new routing can be effectively leveraged given modern communication protocols that allow entities to exchange information about relevant network conditions, which enables an intermediate node or router to forward to receivers a subset of the available packets depending on such conditions. The invention's relaxation of the hierarchical structure provides enough freedom for a well optimized design to achieve the best attainable quality at both the receivers, yet significantly reduce the transmission and storage rates. The ideas underlying the embodiments of the invention evolve from certain concepts in information theory and specifically the concept of common information [16], [17].

Along with bit-rate scalability, the suboptimality of conventional scalable coding also (and importantly) extends to heterogeneous scenarios with different dimensions of quality. Embodiments of the invention cover the context of bit-rate scalability with or without prediction, as well as optimal heterogeneous layered coding, i.e., improvement in quality simultaneously along different dimensions, for example, bit rate and dynamic range per sample.

In one embodiment of the invention, the MPEG scalable AAC [4], [11] is modified to provide two reconstructed signal quality levels (base and enhancement levels) with three encoded data layers (common, base and enhancement layers). Note that the common layer information is sent to both the base and enhancement decoders, while the base and enhancement layers contain information that is "private" for their respective decoders. Embodiments of the invention also employ a technique for joint optimization of all the layers to minimize an overall cost which achieves a specific trade-off between total transmit rate and total receive rate. Experimental evaluation results demonstrate the ability of the embodiments of the invention to achieve various intermediate points in the tradeoff between total transmit rate and total receive rate at a better overall cost than existing techniques.

In another embodiment of the invention, irregular quantizers, which individually may not provide any useful reconstruction, are employed at each layer, wherein information from multiple such quantizers can be combined to achieve useful reconstruction at each quality level. This embodiment of the invention enables optimally capturing the common information between various quality levels.

In view of the above and as described herein, embodiments of the present invention disclose methods and apparatuses for optimal joint layered coding at multiple quality levels. The strict hierarchical structure of the conventional scalable coding is replaced by a flexible structure, a recursive technique to estimate parameters of all layers is employed, and irregular quantizers are used for optimal extraction of common information. Embodiments of the invention cover various types of scalability and can be integrated into several applications, such as content distribution servers, and various content consumption devices, to provide storage and transmission efficiency to such systems.

BRIEF DESCRIPTION OF THE DRAWINGS

Referring now to the drawings in which like reference numbers represent corresponding parts throughout.

DETAILED DESCRIPTION OF THE INVENTION

Figure 1:
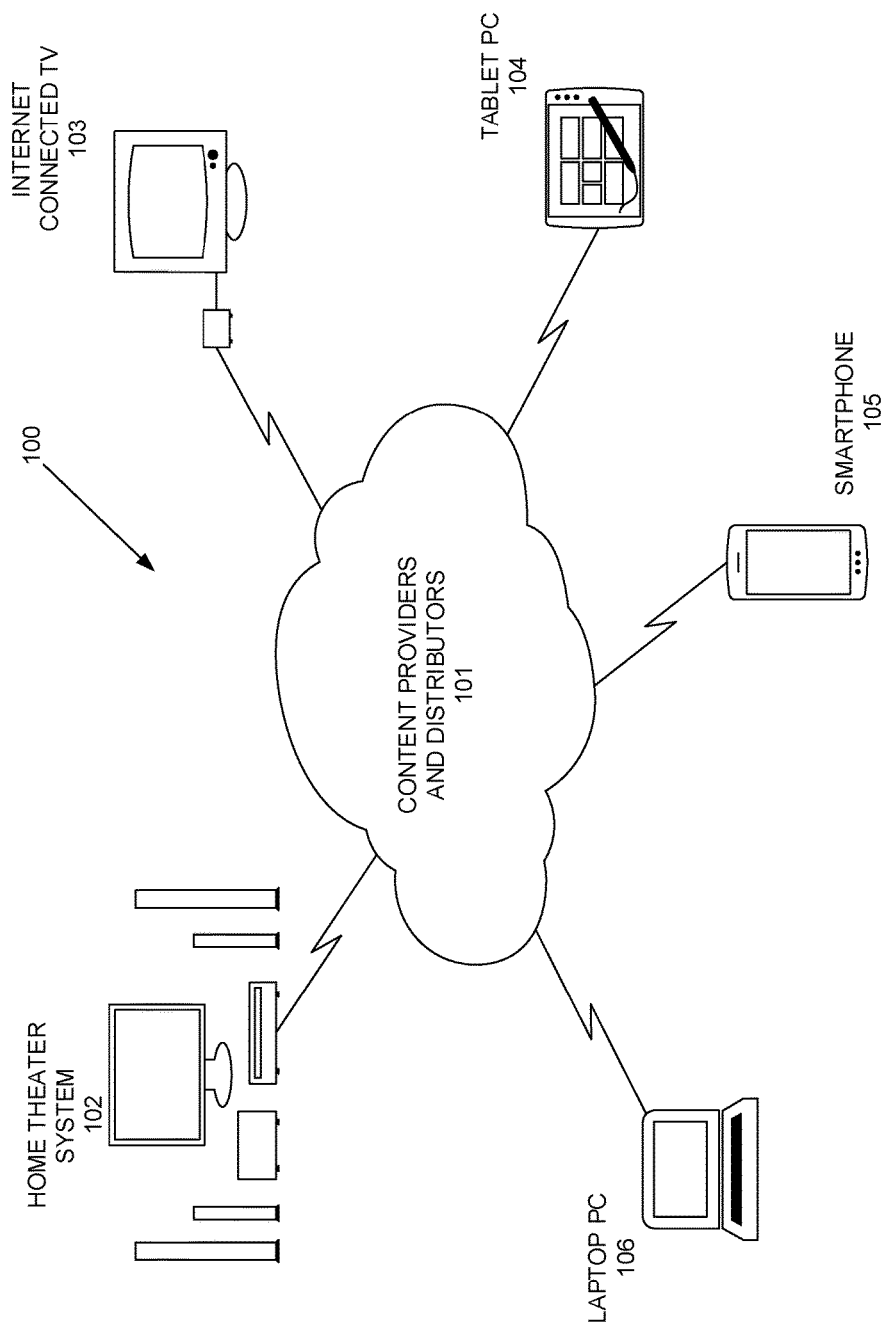
FIG. 1 illustrates a typical consumer oriented heterogeneous network in accordance with one or more embodiments of the present invention.
Figure 2:
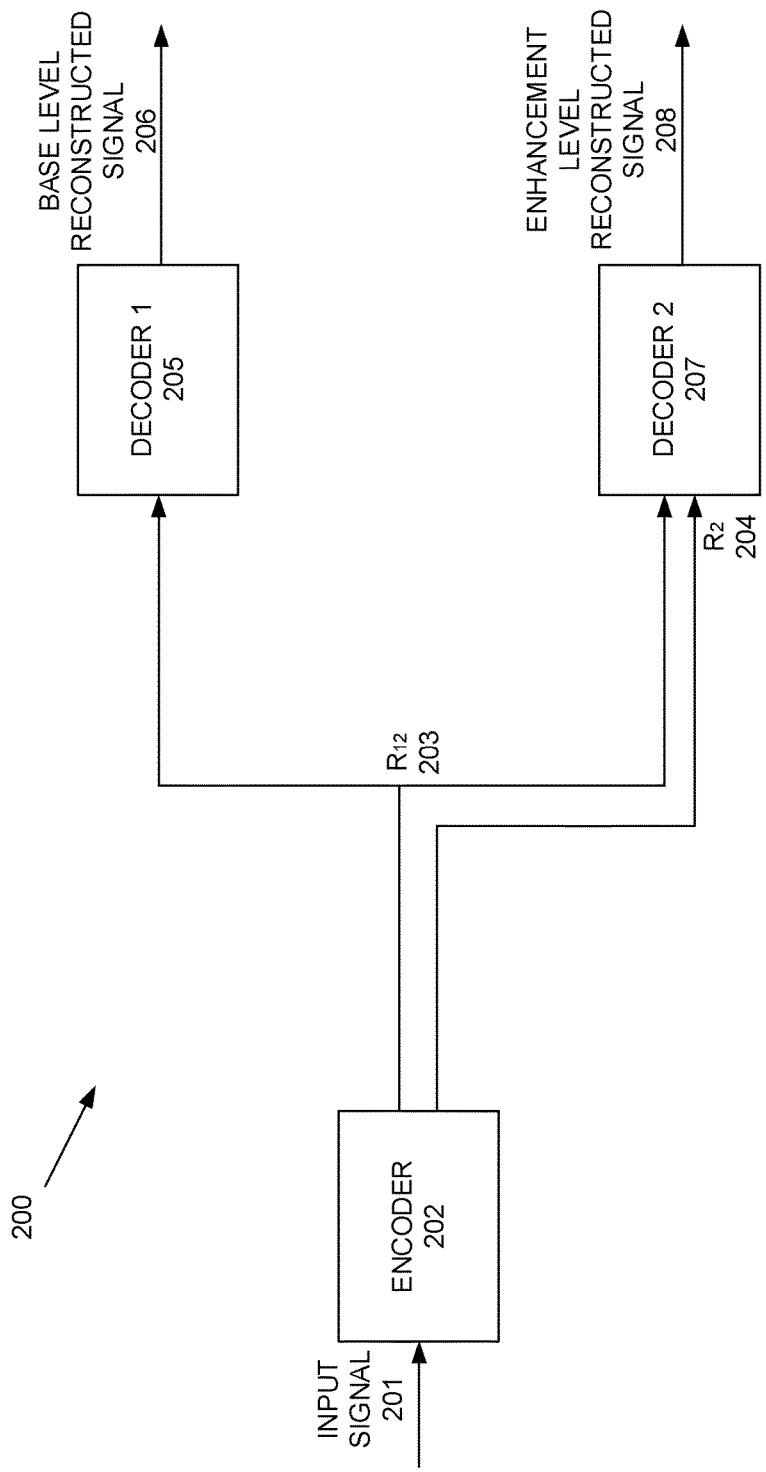
FIG. 2 illustrates a two quality level conventional scalable coder.
Figure 3:
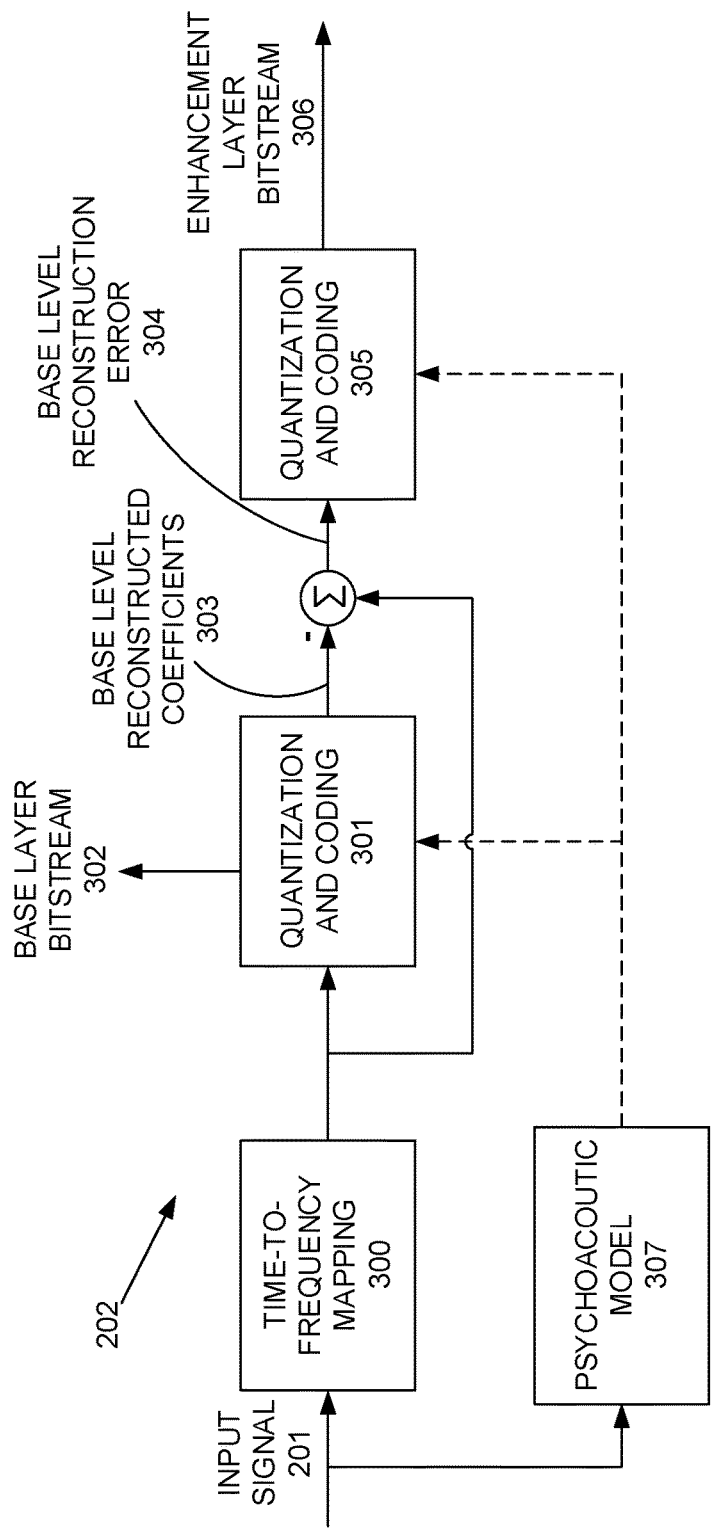
FIG. 3 illustrates a two quality level conventional scalable audio encoder.

In the following description of the preferred embodiment, reference is made to the accompanying drawings which form a part hereof, and in which is shown by way of illustration a specific embodiment in which the invention may be practiced. It is to be understood that other embodiments may be utilized and structural changes may be made without departing from the scope of the present invention.

Overview

The efficient use of network infrastructure is key to providing affordable local and global access to information via the internet, wireless communications, etc. This invention provides a new paradigm and approach to address major challenges in effectively providing multimedia information to every type of data consumption device at the best achievable quality level subject to resource constraints. The invention provides content delivery system designers the capability to control the rate-distortion operating point based on the relative importance of reducing overall storage (or transmission rate in case of broadcast) and enhancing quality at each level.

This invention provides a new, flexible paradigm, where only an optimal subset of information from lower quality levels is transmitted to higher level decoders, so as to capture the benefits of common information without incurring the "scalable coding penalty". For example, an embodiment of the invention for two reconstructed signal quality levels (base and enhancement levels) comprises encoding the signal into three encoded data layers (common, base and enhancement layers), wherein each one of the base and enhancement encoded data layers directly complements the data provided by the common layer, to achieve its respective reconstructed signal quality level. In other words, the common layer information is sent to both the base and enhancement decoders, while the base and enhancement layers contain information that is "private" for their respective decoders. Information-theoretic analysis [18] provides characterization of the framework and evidence that this flexibility is key to approaching optimality in signal storage and transmission at different quality levels, by optimally exploiting their "common information." Embodiments of the invention also provide an iterative strategy to jointly optimize parameters of all the layers, wherein parameters of each layer are selected while accounting for impact on other layers and the optimization is repeated for each layer in a loop, until convergence or until a desired level of performance is met. Results from experimental evaluation of the embodiments of the invention for audio signals substantiate its effectiveness in practical scenarios. Embodiments of the invention also provide a technique of employing irregular quantizers for different layers to optimally extract "common information". Embodiments of the invention also cover layered coding of video signals, layered coding at more than two levels of quality, and layered coding for different types of quality (e.g., data rates, video/audio spatial/temporal resolution, dynamic range per sample, number of channels and views).

Such embodiments have been evaluated after incorporation within existing coding frameworks, such as within the framework of MPEG scalable AAC. Experimental results for these embodiments provide evidence for considerable gains, and hence for the effectiveness of such embodiments.

Detailed Technical Description

Figure 4:
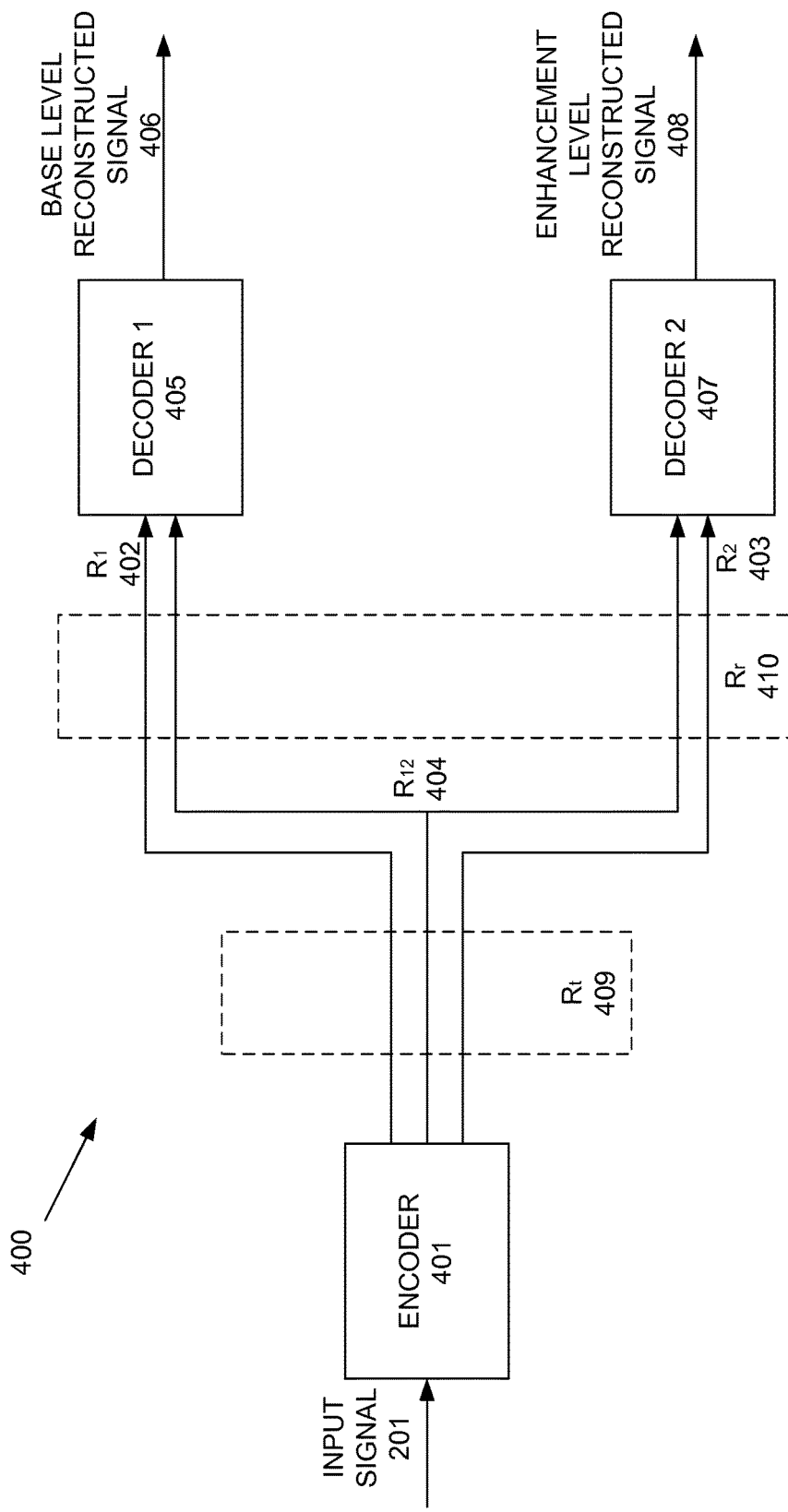
FIG. 4 illustrates a paradigm for two-quality level coding in accordance with one or more embodiments of the present invention.

The first set of embodiments of the invention focuses on layered coding at two quality levels (i.e., at two bit rates). The overall paradigm for common information-based two-quality level coding 400 is illustrated in FIG. 4. The input signal 201, is encoded in 401 to generate three bitstreams $R_1$ 402, the private information for base level, $R_2$ 403, the private information for enhancement level, and $R_{12}$ 404, the common information. $R_1$ and $R_{12}$ are sent to the first decoder 405 to generate the base level reconstructed signal 406. $R_2$ and $R_{12}$ are sent to the second decoder 407 to generate the enhancement level reconstructed signal 408. The total transmit rate $R_t$ 409 is the sum of rates sent by the encoder, $R_t=R_{12}+R_1+R_2$, and the total receive rate $R_r$ 410 is the sum of rates received by all the decoders, $R_r=2R_{12}+R_1+R_2$. The flexibility of the invention provides the opportunity to optimally encode the common information between the quality levels separately and also importantly provides the opportunity to control the layered coding penalty and achieve intermediate operating points in terms of the trade-off between total transmit rate and total receive rate.

Figure 5:
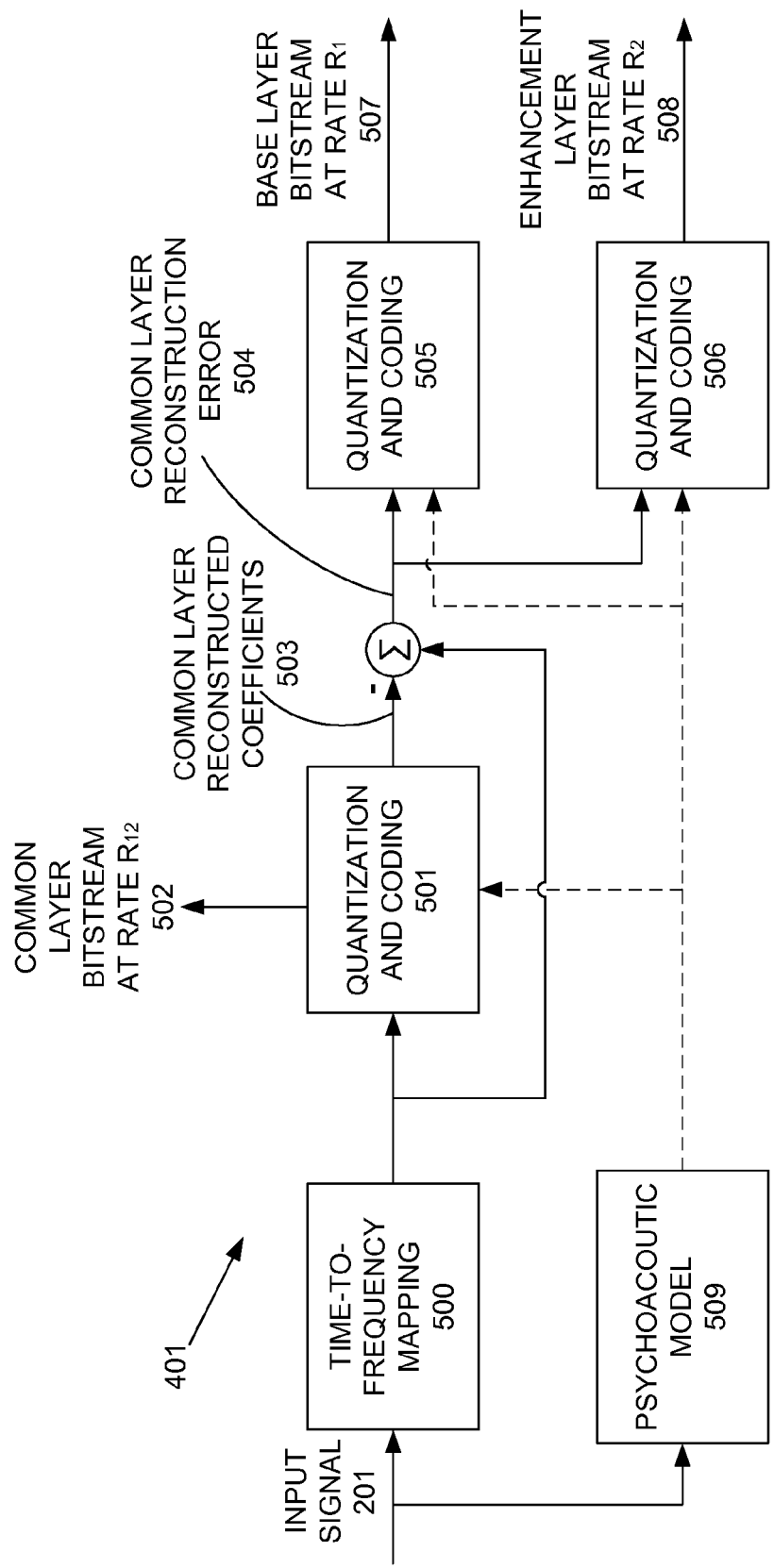
FIG. 5 illustrates a two-quality level audio encoder in accordance with one or more embodiments of the present invention.

In one embodiment of the invention, the above described paradigm is employed within the MPEG scalable AAC. FIG. 5 illustrates a two-quality level audio encoder 401 in accordance with this embodiment of the invention. Common layer coding is performed by a non-scalable AAC coder, where the input audio signal 201 is divided into frames, each frame is transformed to the frequency domain in 500, and then the SFs and HCBs for the transform coefficients are selected in the quantization and coding module 501 to generate the common layer bitstream at rate $R_{12}$ 502. The coarse common layer reconstructed coefficients 503 are subtracted from the original transform coefficients to generate the spectral representation of the common layer reconstruction error 504. Two sets of SFs and HCBs for this error spectrum, corresponding to two resolutions, is then determined in two quantization and coding modules 505 and 506, to generate the base layer bitstream at rate $R_1$ 507 and the enhancement layer bitstream at rate $R_2$ 508, respectively. The quantization and coding of the error spectrum follows the same process as that of non-scalable AAC. The masking thresholds required for NMR calculation are provided by the psychoacoustic model 509.

The common information can be extracted in several ways within the scope of the present invention. Note that this step is intricately connected to a myriad of coder modules and considerations including, but not limited to, the optimization of a perceptual distortion criterion involving a masking threshold, dependencies across layers and bands, such as effective bit allocation across subbands, entropy coding, run-length coding and differential encoding of Huffman-codebook choices and scale factors, respectively, across bands, all impacted by the addition of a common layer. In one embodiment of the invention, a joint coding methodology is adopted. The problem setting for two quality levels defines $D_1$ and $D_2$, the distortion at the base and enhancement levels, respectively ($D_2<D_1$), which are subject to $D_1^*$, $D_2^*$, the corresponding distortion constraints ($D_2^*<D_1^*$). Given these constraints, the overall cost to optimize the trade-off between total transmit rate and total receive rate may be defined as:

$$J=(1-\alpha)R_t+\alpha R_r=(1+\alpha)R_{12}+R_1+R_2, \quad (1)$$

where $\alpha$ controls the trade-off. Note that while the base and enhancement level reconstructed signals must satisfy distortion constraints ($D_1^*$, $D_2^*$), there is no explicit constraint on the common layer. It may hence be viewed as a free (unconstrained) parameter and adjusted to minimize the overall cost. Let P denote the set of all parameters, which includes SFs and HCBs at all the layers and the distortion constraint at common layer. The optimization problem is given as:

$$P^*=\mathrm{argmin}_P J$$

subject to the constraint:

$$s.t.\ D_1<D_1^*, D_2<D_2^*. \quad (2)$$

Let $P_{12}$ denote the distortion constraint, SFs and HCBs at the common layer, and $P_1$, $P_2$ denote the SFs and HCBs at the base and enhancement layers, respectively. In this embodiment of the invention, joint optimization of all the layers is performed by successively and iteratively selecting parameters for each layer while accounting for impact on the overall cost in (1), similar to [15]. Optimization of a single layer to find SFs and HCBs given a distortion constraint may be done via a trellis based search [20], [21]. This search accounts for any of the popular perceptual criteria (involving NMR) and for inter-band (and inter-frame) dependencies by reposing the optimization problem in a way that enables embedding it in a trellis, thereby enabling lower complexity Viterbi decoding to find the optimal solution. Optimal conditional quantizers that account for all the available information from the common layer, similar to techniques proposed in [22], may be employed within the refinement coders of an embodiment of the invention. In another embodiment, an optimal distortion constraint for the common layer is determined by repeating a trellis based search for various distortion constraints and selecting the one that minimizes the overall cost. Here, in every iteration of the procedure, the common layer optimization minimizes (1) over all parameters $P_{12}$, while maintaining $P_1$, $P_2$ unchanged from previous iteration. Note that, although $P_1$, $P_2$ are fixed at this step, a change in $P_{12}$ modifies the input to base and enhancement layer, thus not only $R_{12}$, but also $R_1$, $R_2$ have to be re-estimated for each new combination of $P_{12}$. Next, the base layer parameters $P_1$ are optimized, given fixed $P_{12}$. In this step only $R_1$ is affected, so minimizing $R_1$ is equivalent to minimizing the overall cost (1). Similarly, the enhancement layer parameters $P_2$ are optimized, given fixed $P_{12}$, and only $R_2$ is affected, so minimizing $R_2$ is equivalent to minimizing the overall cost (1).

The first iteration of common layer needs an initialization of base and enhancement layers. An "informed" initialization may be employed, where every node in the common layer trellis for a given distortion constraint may be associated with the best available "guess" of the base and enhancement layer parameters, and using these parameters the overall cost of (1) at every node of the trellis may be calculated. Optimizing such trellis for multiple common layer distortion constraints gives the initial values of $P_{12}$. The overall algorithm can be summarized as:

1. Produce an "informed" initialization of common layer parameters, $P_{12}$.
2. Repeat the following three steps until convergence, or until a pre-specified exit condition is met:
   (a) Optimize base layer to find parameters, $P_1$, that minimize $R_1$, given the current choice of $P_{12}$.
   (b) Optimize enhancement layer to find parameters, $P_2$, that minimize $R_2$, given the current choice of $P_{12}$.
   (c) Optimize common layer to find parameters, $P_{12}$, that minimize overall cost in (1), given the current choice of $P_1$ and $P_2$.

Convergence is guaranteed as the overall cost is monotonically non-increasing in every step of the iteration. Further, this iterative algorithm can be extended in a straightforward manner to optimize an arbitrary number of layers in accordance with this invention. Experiments with this embodiment of the invention, implemented in the framework of the MPEG scalable AAC, demonstrate that intermediate operating points in the trade-off between total transmit rate and total receive rate can been achieved, with an overall cost that is lower than independent encoding and conventional scalable coding. This capability is extremely useful for content delivery system designers who need to control the rate-distortion operating point based on the relative importance of total transmit rate and total receive rate.

Multi-Level Coding

Figure 6:
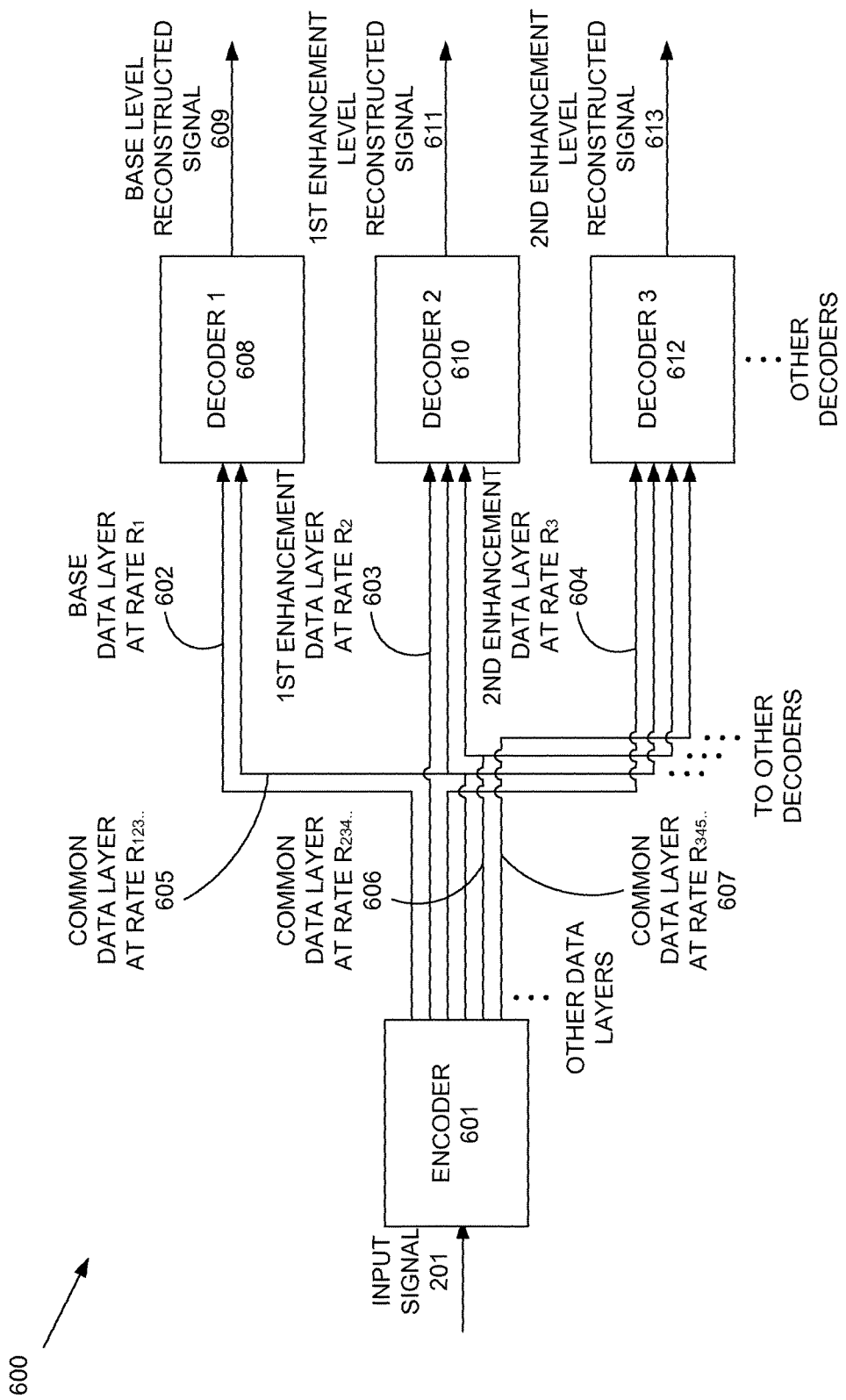
FIG. 6 illustrates a paradigm for multi-level coding in accordance with one or more embodiments of the present invention.
Figure 7:
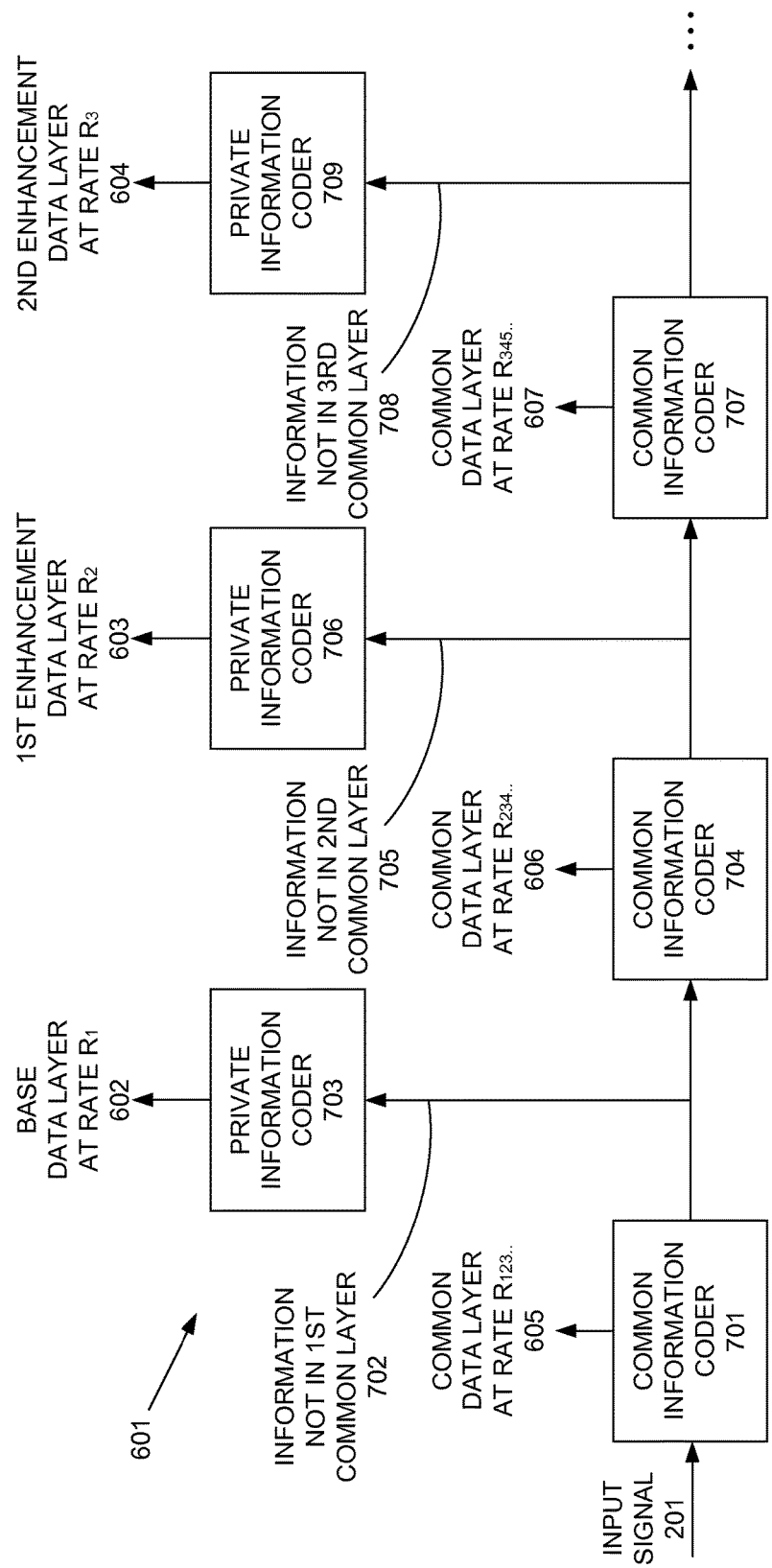
FIG. 7 illustrates a multi-level encoder in accordance with one or more embodiments of the present invention.

The following embodiments of the invention focus on layered coding for more than two quality levels, i.e., one base level and more than one enhancement levels, and each of the common layers is used to generate a subset of two or more of the base level reconstructed signal and the enhancement level reconstructed signals. In one embodiment of the invention, there is one common layer in the encoded data that is used to generate the base level reconstructed signal and all of the enhancement level reconstructed signals. However, such embodiment may be too limiting in some applications. Thus, in another embodiment of the invention, there is one common layer in the encoded data for each subset of two or more of the base level reconstructed signal and the enhancement level reconstructed signals, which implies combinatorial growth of the common layers in the number of quality levels. For example, with 3 quality levels, there will be 7 encoded data layers, 4 of which are common layers. The 7 layers contain data encoded at rates $R_1$, $R_2$, $R_3$, $R_{12}$, $R_{23}$, $R_{13}$, and $R_{123}$. This embodiment of the invention, while theoretically optimal and useful to obtain asymptotic bounds and regions, may be intractable in many practical settings. Thus, in another embodiment of the invention, a linearly growing rate-splitting approach without combinatorial growth may be employed, wherein the encoded data comprises a number of common layers that equals the number of enhancement level reconstructed signals, and each higher quality enhancement level reconstructed signal is generated from one private layer of encoded data, and at least all of the common layers used to generate the lower quality enhancement level reconstructed signals and the base level reconstructed signal. Hence, for the 3 layer example, only the rates $R_1$, $R_2$, $R_3$, $R_{23}$, and $R_{123}$ remain (where $D_1 > D_2 > D_3$). FIG. 6 illustrates the overall paradigm for multi-level coding 600 in accordance with this embodiment. The input signal 201, is encoded in 601 to generate level specific private information and a number of common layers that equals the number of enhancement level reconstructed signals. The level specific private information includes, base data layer at rate $R_1$ 602, first enhancement data layer at rate $R_2$ 603, second enhancement data layer at rate $R_3$ 604, and so on. The common data layers include, common data layer at rate $R_{123...}$ 605, common data layer at rate $R_{234...}$ 606, common data layer at rate $R_{345...}$ 607, and so on. $R_1$ and $R_{123...}$ are sent to the first decoder 608 to generate the base level reconstructed signal 609. $R_2$, $R_{123...}$, and $R_{234...}$ are sent to the second decoder 610 to generate the first enhancement level reconstructed signal 611. $R_3$, $R_{123...}$, $R_{234...}$, and $R_{345...}$ are sent to the third decoder 612 to generate the second enhancement level reconstructed signal 613. Similarly other decoders receive their private information, and at least all the common data layers used to generate lower quality level reconstructed signals to generate a higher quality one of the enhancement level reconstructed signals. FIG. 7 illustrates a multi-level encoder 601 in accordance with this embodiment of the invention. The input signal 201 is encoded in a common information coder 701 to generate common data layer at rate $R_{123...}$ 605, which is sent to generate all the reconstructed signals. All the complementary information (not captured in first common layer) 702 is processed by a private information coder 703 to generate base data layer at rate $R_1$ 602. The above complementary information 702 is again encoded in a second common information coder 704 to generate common data layer at rate $R_{234...}$ 606, which is sent to generate all but the base level reconstructed signal. The information complementary to the first and second common layers 705 is encoded in another private information coder 706 to generate first enhancement data layer at rate $R_2$ 603. The same complementary information 705 is again encoded in another common information coder 707 to generate common data layer at rate $R_{345...}$ 607, which is sent to generate all but the base level reconstructed signal and the first enhancement level reconstructed signal. The information complementary to the first, second and third common layers 708 is encoded in another private information coder 709 to generate second enhancement data layer at rate $R_3$ 604. The above described procedure is then repeated to generate all the common and private data for the desired number of quality levels. In another embodiment of the invention, the iterative joint optimization of layers similar to the one used for two quality levels is employed.

Common Information and Layered Predictive Coding

The above embodiments of the invention have implicitly assumed memoryless sources in the sense that a current segment of the signal is not predicted from a previous segment of the reconstructed signal. However, it is crucial to develop encoding mechanisms for sources with memory as, more often than not, real world multimedia content exhibit considerable temporal dependencies, especially in applications such as low delay audio coding and video coding. One embodiment of the invention targets sources with memory wherein a current segment of the signal is predicted from a previous segment of the reconstructed signal, and the data layers are generated by processing the prediction errors. In the conventional scalable coding scheme, the base layer is essentially coded by a non-scalable coder, whereas the enhancement layer has access to both the current base layer information and the prior enhancement level reconstructed signal. Conventional scalable coders typically switch between the two sources, or a linear combination thereof, as the prediction for enhancement layer, which is inherently sub-optimal, since they do not exploit all the available information. An alternative approach was proposed in [25] that optimally combines the prior enhancement level reconstructed signal, with the current base layer information, in an appropriately derived estimation-theoretic (ET) framework. The fact that the original sample must reside in the quantization interval associated with the base layer quantization index, effectively captures all the information provided by the base layer. The optimal predictor is thus formulated as the conditional expectation with respect to the prior enhancement level reconstructed signal, with the pdf truncated (and normalized) by the base layer quantization interval. Beside its proven optimality, the ET approach was demonstrated in practical contexts, including video and audio coding, to substantially outperform existing scalable coders.

In one embodiment of the invention, the ET approach may be employed in the common information based framework, to take into account all available information at the refinement encoders, as well as the interplay between the layer-specific 'refinement' bitstreams.

In audio coding, handling sources with memory is important for low delay audio coders, as the short frame lengths used in such coders mandates the use of inter-frame prediction to improve compression efficiency. In one embodiment of the invention, a recently proposed inter-frame prediction for audio signals [19] may be leveraged, which resolves major difficulties due to the polyphonic nature of music signals by the use of cascaded long-term prediction filters. In another embodiment of the invention, the previous embodiment may be extended to an overall framework of multi-level coding with ET prediction which accounts for the harmonic structure of the signal.

It is well known that video coders achieve substantial compression gains mainly due to exploitation of temporal correlation, via motion compensated prediction. While techniques to perform prediction which exploit all the information available, were proposed in [19], the scalable coder still suffers from suboptimality due to the rigid hierarchical structure. As discussed previously, this structure could only attain optimality if the video signal is jointly successively refinable over the relevant set of operational points. But it is widely recognized that this is not the case. Thus, in one embodiment of the invention the coding scheme based on the common information paradigm is employed for scalable video coding. This coding scheme will effectively generate more layers than the target reconstruction levels, thus allowing more flexibility in the design to better approach the rate-distortion bound. The ET principle for optimally combining all available information may then be employed in one or more embodiments of the invention, while accounting for various factors encountered in video coding, including motion compensated prediction, quantization, entropy coding, etc.

Heterogeneous Layered Coding

Quality Dimensions: Improving the quality of user experience with multimedia signals is not limited to signal fidelity (as measured in terms of a distortion criterion), but requires extensions to other "dimensions" such as temporal and spatial resolution in video, bandwidth and number of channels in audio, and dynamic range per sample for both signals. These scalability requirements arise from the differing capabilities of the various user devices and necessitates a heterogeneous layered coder. For example, a music event may be simultaneously streamed to different users using equipment ranging from Bluetooth single channel receiver, stereo headsets, to multi-channel home theater systems. With the requirement of reconstructing content at different points in this multi-dimensional space, encoding with a strict hierarchical structure is overly constrained and highly suboptimal. Thus, current scalable coders that enforce a rigid hierarchical structure can never achieve optimality at all the layers. This major shortcoming of existing techniques is remedied by adding the requisite structural flexibility, following the main principles of this invention. This embodiment of the invention enables optimal distribution of rate amongst all subsets of layers, including private information to individual quality levels. Furthermore, many applications may require several quality levels and dimensions, leading to difficulty with the combinatorial growth in the number of common data layers. The previously described embodiment of the invention with linear rate splitting may not be applicable, since it relies on the monotonically decreasing distortion; however, in this case, higher levels may share separate common information with lower levels of different quality dimensions. Hence, in another embodiment of the invention, the number of common layers, and the subset of the reconstructed signals that each of the common layers is used to generate, may be optimized given signal training data, based on discerned commonalities, so as to provide a manageable degree of rate splitting. In another embodiment of the invention, further flexibility may be provided by adapting the number of common layers, and the subset of the reconstructed signals that each of the common layers is used to generate, to variation in signal statistics obtained from the signal or the reconstructed signals.

Joint Coding of Correlated Sources: As noted above, scalability in quality can be along different dimensions such as resolution, bandwidth and fidelity. But some types of such scalability, particularly in terms of number of audio channels or video views, are better modeled as multiple correlated sources whose dependencies are reflected in the common information they share. In one embodiment of the invention, the common information framework is extended to the explicit case of correlated sources. In another embodiment of the invention, a flexible layered information-sharing structure may be optimized according to the theoretical foundation that allows for multiple common information bitstreams.

Irregular Quantizers

Figure 8:
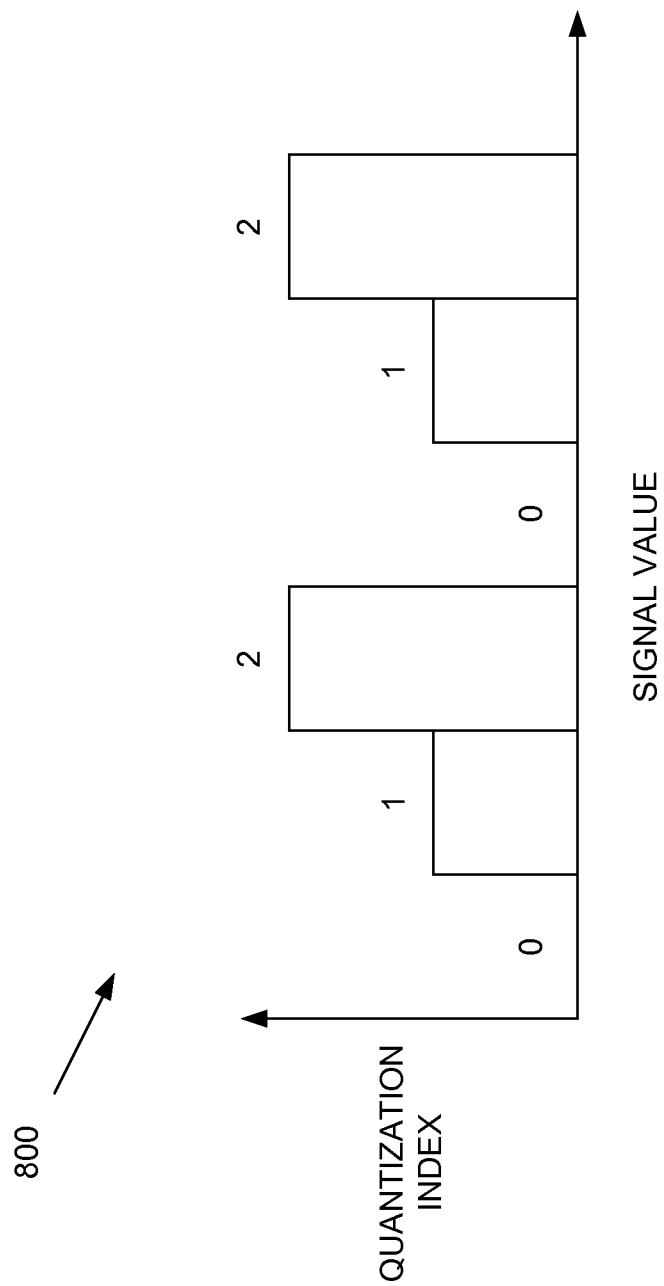
FIG. 8 illustrates an irregular quantizer in accordance with one or more embodiments of the present invention.

In one embodiment of the invention, one or more of the data layers of the encoded data may be generated by quantizing the signal with irregular quantizers. Unlike regular quantization partitions, which consist of convex cells, irregular quantizer cells may not be contiguous. Thus, the information provided by an individual irregular quantizer may not provide a useful reconstruction of the signal. FIG. 8 illustrates an example irregular scalar quantizer 800, wherein multiple segments of signal value are assigned to a single quantization index. In this case, the index value does not allow for a useful estimate of the signal value. A useful reconstruction at each quality level may, however, be obtained by combining information from two or more such irregular quantizers, wherein the combined information narrows the range, via intersection, to a single small interval. The introduction of such flexibility to the quantizer structure enables optimally capturing the common information between various quality levels.

Hardware Environment

Figure 9:
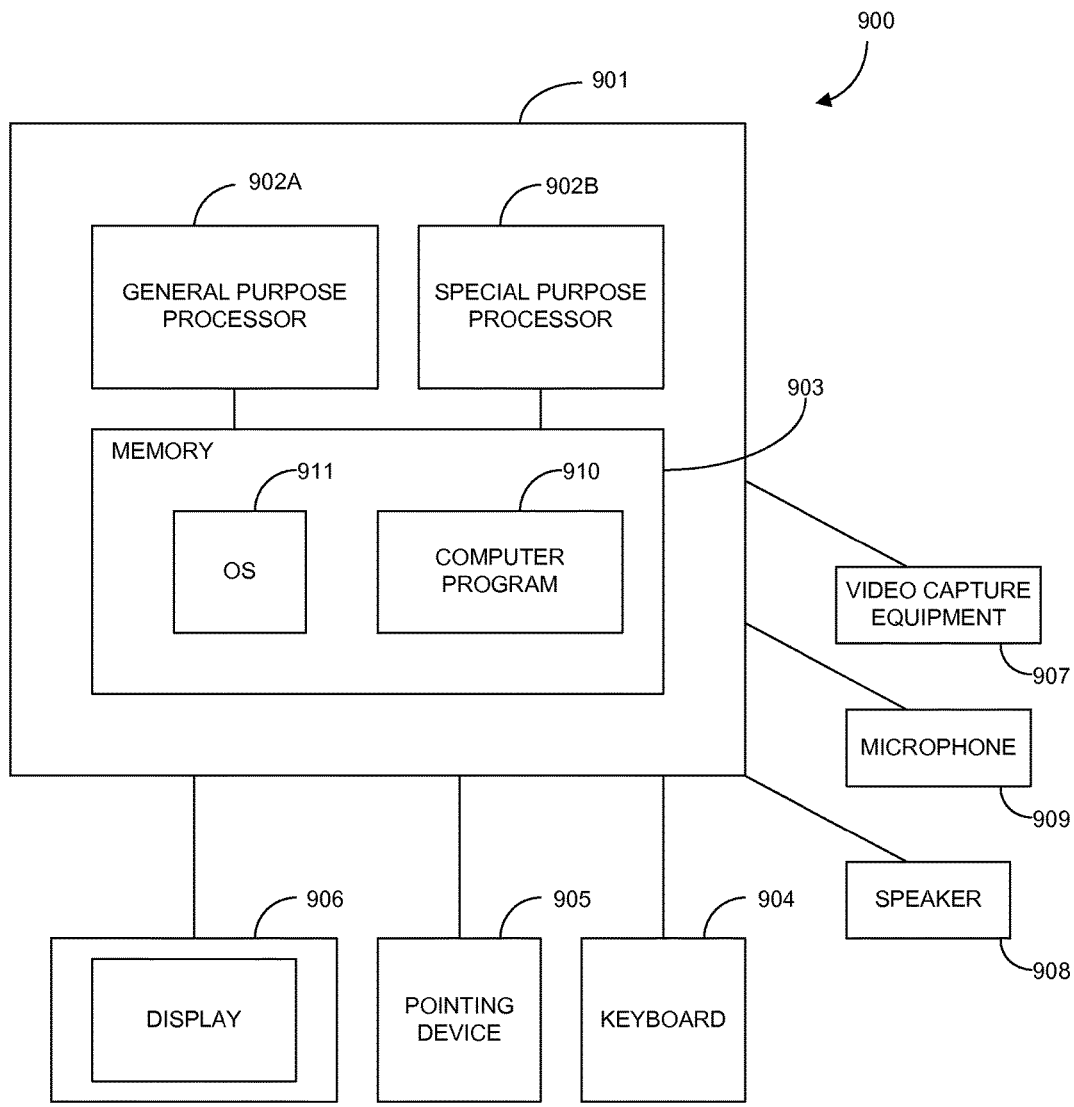
FIG. 9 is an exemplary hardware and software environment used to implement one or more embodiments of the invention.

FIG. 9 is an exemplary hardware and software environment 900 used to implement one or more embodiments of the invention. The hardware and software environment includes a computer 901 and may include peripherals. The computer 901 comprises a general purpose hardware processor 902A and/or a special purpose hardware processor 902B (hereinafter alternatively collectively referred to as processor 902) and a memory 903, such as random access memory (RAM). The computer 901 may be coupled to, and/or integrated with, other devices, including input/output (I/O) devices such as a keyboard 904 and a cursor control device 905 (e.g., a mouse, a pointing device, pen and tablet, touch screen, multi-touch device, etc.), a display 906, a video capture equipment 907 (such as a camera), a speaker 908 (or multiple speakers or a headset) and a microphone 909. In yet another embodiment, the computer 901 may comprise a multi-touch device, mobile phone, gaming system, internet enabled television, television set top box, multimedia content delivery server, or other internet enabled device executing on various platforms and operating systems.

In one embodiment, the computer 901 operates by the general purpose processor 902A performing instructions defined by a computer program 910 under control of an operating system 911. The computer program 910 and/or the operating system 911 may be stored in the memory 903 and may interface with the user and/or other devices to accept input and commands and, based on such input and commands and the instructions defined by the computer program 910 and operating system 911, to provide output and results.

The layered coding of signals and parameter estimation techniques described herein may be performed within/by computer program 910 and/or may be executed by processors 902. Alternatively, or in addition, the components required for layered coding of signals may be part of computer 901 or accessed via computer 901.

Output/results may be played on speaker 908 and/or displayed on 906 or provided to another device for playback and/or display or further processing or action.

Some or all of the operations performed by the computer 901 according to the computer program 910 instructions may be implemented in a special purpose processor 902B. In this embodiment, the some or all of the computer program 910 instructions may be implemented via firmware instructions stored in a read only memory (ROM), a programmable read only memory (PROM) or flash memory within the special purpose processor 902B or in memory 903. The special purpose processor 902B may also be hardwired through circuit design to perform some or all of the operations to implement the present invention. Further, the special purpose processor 902B may be a hybrid processor, which includes dedicated circuitry for performing a subset of functions, and other circuits for performing more general functions such as responding to computer program 910 instructions. In one embodiment, the special purpose processor 902B is an application specific integrated circuit (ASIC).

Of course, those skilled in the art will recognize that any combination of the above components, or any number of different components, peripherals, and other devices, may be used with the computer 901.

Logical Flow

Figure 10:
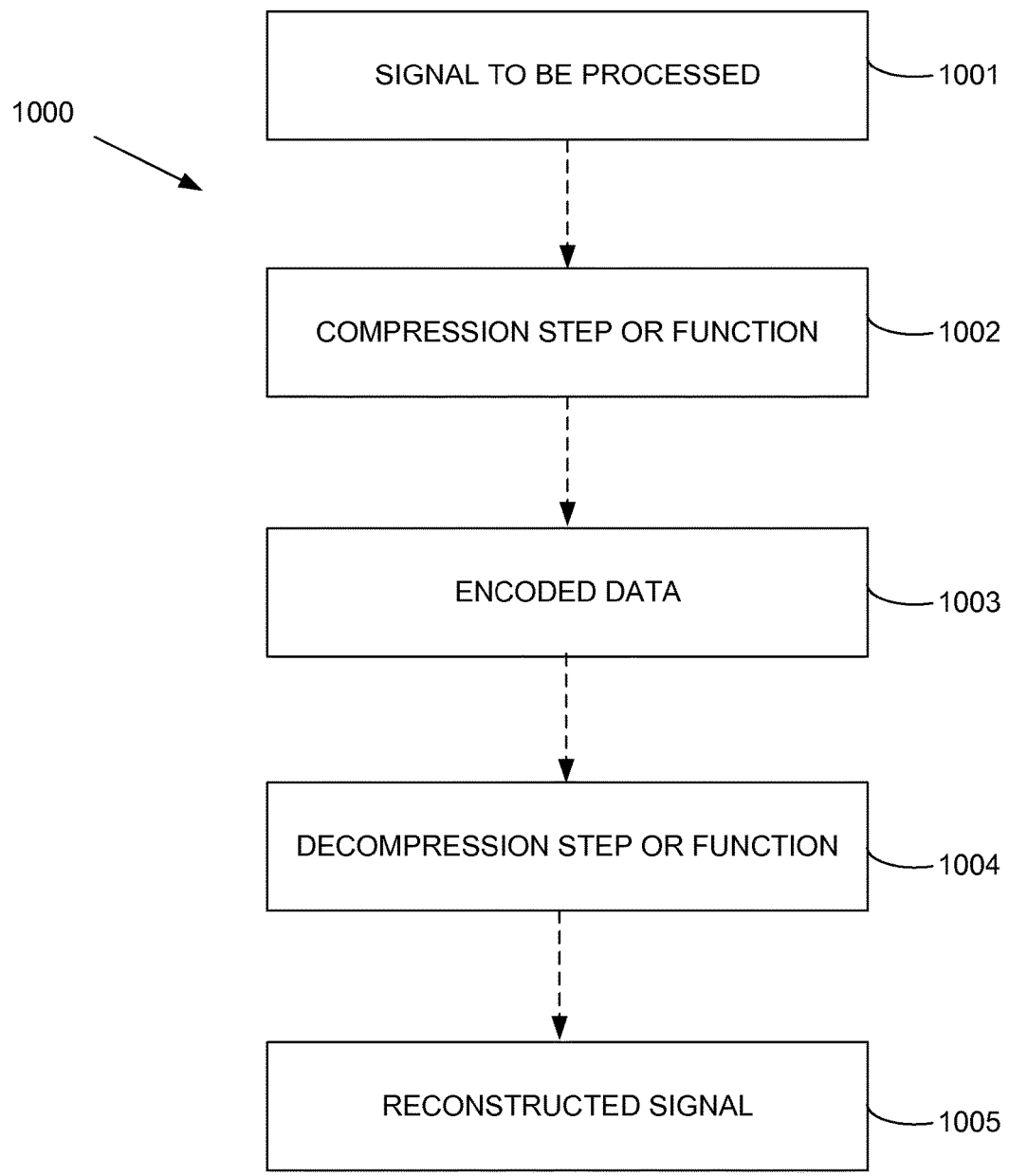
FIG. 10 illustrates the logical flow for processing a signal in accordance with one or more embodiments of the invention.

FIG. 10 illustrates the logical flow 1000 for processing a signal in accordance with one or more embodiments of the invention. Note that all of these steps or functions may be performed by a device or that a device may only perform a subset of the steps or functions. Thus, a device may perform the compressing steps or functions, the decompressing steps or functions, or both the compressing and decompressing steps or functions.

Block 1001 represents a signal to be processed (compressed and/or decompressed) in a layered manner. Preferably, this signal processing is performed utilizing a relaxed hierarchical structure, wherein only an optimal subset of information from lower quality levels is transmitted to higher level decoders.

Block 1002 represents a compressing step or function, which processes the signal in a processor to generate encoded data 1003, wherein the encoded data 1003 comprises three or more distinct data layers, including one base layer, one or more common layers, and one or more enhancement layers. One or more of the data layers may be generated by quantizing the signal 1001 with irregular quantizers.

The compressing step or function 1002 may further comprise jointly optimizing one or more compression parameters to generate two or more of the data layers of the encoded data 1003. The jointly optimizing step or function comprises adjusting one or more of the compression parameters for a given one of the data layers, while accounting for its impact on others of the data layers; and iterating over the data layers until convergence or a desired level of performance is met.

Block 1004 represents a decompressing step or function, which processes the encoded data 1003 in a processor to generate a reconstructed signal 1005 approximating the signal 1001. The reconstructed signal 1005 is a base level reconstructed signal or an enhancement level reconstructed signal, wherein the enhancement level reconstructed signal is of higher quality than the base level reconstructed signal, the base level reconstructed signal is generated only from the base layer and one or more of the common layers, and the enhancement level reconstructed signal is generated only from one of the enhancement layers and one or more of the common layers.

In addition, the encoded data 1003 may comprise more than one enhancement layers, and each of the common layers may be used to generate a subset of two or more of the base level reconstructed signal and the enhancement level reconstructed signals. In one embodiment, the encoded data 1003 may comprise only one common layer that is used to generate the base level reconstructed signal and all of the enhancement level reconstructed signals. In another embodiment, the encoded data 1003 may comprise one common layer for each subset of two or more of the base level reconstructed signal and the enhancement level reconstructed signals. In yet another embodiment, the encoded data 1003 may comprise a number of common layers that equals the number of enhancement level reconstructed signals, and a higher quality one of the enhancement level reconstructed signals is generated from at least all of the common layers used to generate a lower quality one of the enhancement level reconstructed signals and the base level reconstructed signal. In yet another embodiment, the number of common layers, and the subset of the base level reconstructed signal and the enhancement level reconstructed signals that each of the common layers is used to generate, may be optimized given signal training data. In yet another embodiment, the number of common layers, and the subset of the base level reconstructed signal and the enhancement level reconstructed signals that each of the common layers is used to generate, may be adapted to variation in signal statistics obtained from the signal or the reconstructed signals.

With regard to the enhancement level reconstructed signals having a higher quality than the base level reconstructed signal, this may be reflected in one or more of a number of different properties. For example, one or more of the enhancement level reconstructed signals, may have more dynamic range per sample, or may be of higher temporal resolution, than the base level reconstructed signal.

When the signal 1001 is an audio signal, one or more of the enhancement level reconstructed signals may have more audio channels than the base level reconstructed signal. Also when the signal 1001 is an audio signal, one or more of the data layers of the encoded data 1003 may be generated utilizing an MPEG (Moving Pictures Experts Group) standard audio coder.

When the signal 1001 is a video signal or an image signal, one or more of the enhancement level reconstructed signals, may have more views, or may be of higher spatial resolution than the base level reconstructed signal. Also when the signal 1001 is a video signal or an image signal, one or more of the data layers of the encoded data 1003 may be generated utilizing an MPEG (Moving Pictures Experts Group) standard video coder or a JPEG (Joint Photographic Experts Group) standard image coder.

Note that either of the compressing or decompressing steps or functions 1002, 1004 may further comprise predicting a current segment of the signal 1001 from a previous segment of the reconstructed signal 1005.

In addition, the base layer, or one or more of the enhancement layers may be generated by processing the reconstruction error from one or more of the common layers.

REFERENCES

The following references are incorporated by reference herein to the description and specification of the present application.

[1] J. Ohm, "Advances in scalable video coding," in Proc. of the IEEE, vol. 93, no. 1, pp. 42-56, 2005.
[2] T. Painter and A. Spanias, "Perceptual coding of digital audio," in Proc. of the IEEE, vol. 88, no. 4, pp. 451-515, 2000.
[3] ISO/IEC JTC1/SC29 13818-7:1997(E), "Information technology—generic coding of moving pictures and associated audio," 1997.
[4] ISO/IEC JTC1/SC29 14496-3:2005, "Information technology—coding of audio-visual objects—part 3: audio—subpart 4: general audio coding," 2005.
[5] H. Schwarz, D. Marpe, and T. Wiegand, "Overview of the scalable video coding extension of the H.264/SVC standard," IEEE Trans. on Circuits and Systems for Video Technology, vol. 17, pp. 1103-1120, September 2007.
[6] ISO/IEC JTC1/SC29 11172-3:1992, "Information technology—coding of moving pictures and associated audio for digital storage media at up to about 1.5 mbps," 1992.
[7] L. Fielder, M. Bosi, G. Davidson, M. Davis, C. Todd, S. Vernon, and L. Fielder, "AC-2 and AC-3: Low-complexity transform-based audio coding," Collected Papers on Digital Audio Bit-Rate Reduction, Audio Eng. Soc, pp. 54-72, 1996.
[8] K. Akagiri, M. Katakura, H. Yamauchi, E. Saito, M. Kohut, M. Nishiguchi, and K. Tsutsui, "Sony systems," The Digital Signal Processing Handbook, 1998.
[9] D. Sinha, J. Johnston, S. Dorward, and S. Quackenbush, "The perceptual audio coder (PAC)," The Digital Signal Processing Handbook, 1998.
[10] K. Brandenburg and T. Sporer, "NMR and masking flag: evaluation of quality using perceptual criteria," in Proc. 11th Int. Conf. Aud. Eng. Soc, 1992, pp. 169-179.
[11] B. Grill, "A bit rate scalable perceptual coder for MPEG-4 audio," in Proc. 103th Conv. Aud. Eng. Soc, September. 997, Paper 4620.
[12] W. Equitz and T. Cover, "Successive refinement of information," IEEE Trans. on Information Theory, vol. 37, no. 2, pp. 269-275, March 1991.
[13] K. Nitadori, "Statistical analysis of $\Delta$PCM," Electron. Commun. in Japan, vol. 48, pp. 17-26, February 1965.
[14] M. Paez and T. Glisson, "Minimum mean-squared-error quantization in speech PCM and DPCM systems," IEEE Trans. on Communications, vol. 20, no. 2, pp. 225-230, 1972.
[15] E. Ravelli, V. Melkote, T. Nanjundaswamy and K. Rose, "Joint Optimization of Base and Enhancement Layers in Scalable Audio Coding", IEEE Trans. Audio, Speech, and Language Processing, vol. 21, no. 4, April 2013.
[16] R. Gray and A. Wyner, "Source coding for a simple network," The Bell Systems Technical Journal, vol. 53, no. 9, pp. 1681-1721, November 1974.
[17] A. Wyner, "The common information of two dependent random variables," IEEE Trans. on Information Theory, vol. 21, no. 2, pp. 163-179, March 1975.
[18] K. Viswanatha, E. Akyol, T. Nanjundaswamy, and K. Rose, "On common information and the encoding of sources that are not successively refinable," in Proc. IEEE Information Theory Workshop (ITW), September 2012.
[19] T. Nanjundaswamy, and K. Rose, "Cascaded Long Term Prediction for Enhanced Compression of Polyphonic Audio Signals", IEEE/ACM Trans. Audio, Speech, and Language Processing, vol. 22, no. 3, March 2014.
[20] A. Aggarwal, S. L. Regunathan, and K. Rose, "A trellis-based optimal parameter value selection for audio coding," IEEE Trans. on Audio, Speech, and Language Processing, vol. 14, no. 2, pp. 623-633, 2006.
[21] V. Melkote and K. Rose, "Trellis-based approaches to rate-distortion optimized audio encoding," IEEE Trans. on Audio, Speech, and Language Processing, vol. 18, no. 2, pp. 330-341, 2010.
[22] A. Aggarwal, S. Regunathan, and K. Rose, "Efficient bit-rate scalability for weighted squared error optimization in audio coding," IEEE Trans. on Audio, Speech, and Language Processing, vol. 14, no. 4, pp. 1313-1327, 2006.
[23] K. Viswanatha, E. Akyol, and K. Rose, "Combinatorial message sharing for a refined multiple descriptions achievable region," in Proc. IEEE International Symposium on Information Theory (ISIT), August 2011, pp. 1312-1316.
[24] K. Viswanatha, E. Akyol, and K. Rose, "A strictly improved achievable region for multiple descriptions using combinatorial message sharing," in Proc. IEEE Information Theory Workshop (ITW), October 2011.
[25] K. Rose and S. Regunathan, "Toward optimality in scalable predictive coding," IEEE Trans. on Image Processing, vol. 10, no. 7, pp. 965-976, 2001.

CONCLUSION

In conclusion, embodiments of the present invention provide an efficient and effective solution to the problem of encoding signals at multiple quality levels. The solution involves a relaxed hierarchical structure, wherein only an optimal subset of information from lower quality levels is transmitted to higher level decoders. Embodiments of the invention complement this framework with a design method to optimize the system parameters. Embodiments also provide specific techniques for employing irregular quantizers and/or estimation theoretic optimal parameter selection and/or content specific optimization (e.g., exploiting harmonic structure in audio, adaptive transform coding and enhanced motion compensated prediction for video) and/or optimization of the structure of the layers. The effectiveness of such an approach has been demonstrated for various commercially used systems and standards, such as audio storage and transmission, and the MPEG scalable AAC standard.

Accordingly, embodiments of the invention enable performance improvement in various multimedia related applications, including for example, multimedia storage and distribution (e.g., Apple™ iTunes™ store, Netflix™ streaming), as well as high efficiency storage and playback devices, wireless multimedia streaming (especially to scenarios that involve streaming service to multiple devices at different qualities), and high-definition teleconferencing (including on smart phones and tablets). Further embodiments may also be utilized in multimedia applications that utilize cloud based content distribution services.

In view of the above, embodiments of the present invention disclose methods and devices for layered coding of signals.

Although the present invention has been described in connection with the preferred embodiments, it is to be understood that modifications and variations may be utilized without departing from the principles and scope of the invention, as those skilled in the art will readily understand. Accordingly, such modifications may be practiced within the scope of the invention and the following claims, and the full range of equivalents of the claims.

This concludes the description of the preferred embodiment of the present invention. The foregoing description of one or more embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto and the full range of equivalents of the claims. The attached claims are presented merely as one aspect of the present invention. The Applicant does not disclaim any claim scope of the present invention through the inclusion of this or any other claim language that is presented or may be presented in the future. Any disclaimers, expressed or implied, made during prosecution of the present application regarding these or other changes are hereby rescinded for at least the reason of recapturing any potential disclaimed claim scope affected by these changes during prosecution of this and any related applications. Applicant reserves the right to file broader claims in one or more continuation or divisional applications in accordance within the full breadth of disclosure, and the full range of doctrine of equivalents of the disclosure, as recited in the original specification.

What is claimed is:

1. A method for processing a signal, comprising:
    compressing, decompressing, or both compressing and decompressing, the signal in a processor, wherein the compressing step comprises processing the signal in the processor to generate encoded data, and the decompressing step comprises processing the encoded data in the processor to generate a reconstructed signal approximating the signal at one of two or more quality levels, wherein:
    the reconstructed signal is a base level reconstructed signal, or one of one or more enhancement level reconstructed signals;
    the base level reconstructed signal approximates the signal at a lowest of the two or more quality levels, and each subsequent one of the one or more enhancement level reconstructed signals approximates the signal at a higher one of the two or more quality levels than the base level reconstructed signal and any preceding one of the enhancement level reconstructed signals;
    the encoded data comprises three or more distinct data layers, including:
        a data layer required to generate the reconstructed signal only at a first one of the two or more quality levels,
        a data layer required to generate the reconstructed signal only at a second one of the two or more quality levels which is higher than the first one of the two or more quality levels, and
        a common data layer required to generate the reconstructed signal at the first one of the two or more quality levels and also required to generate the reconstructed signal at the second one of the two or more quality levels.

2. The method of claim 1, wherein one or more of the data layers are generated by quantizing the signal with irregular quantizers.

3. The method of claim 1, wherein the compressing step further comprises jointly optimizing one or more compression parameters to generate two or more of the data layers of the encoded data.

4. The method of claim 3, wherein the jointly optimizing step comprises adjusting one or more of the compression parameters for a given one of the data layers, while accounting for its impact on others of the data layers; and iterating over the data layers until convergence or a desired level of performance is met.

5. The method of claim 1, wherein one or more of the enhancement level reconstructed signals, have more dynamic range per sample, or are of higher temporal resolution, than the base level reconstructed signal.

6. The method of claim 1, wherein the signal is an audio signal.

7. The method of claim 6, wherein one or more of the enhancement level reconstructed signals have more audio channels than the base level reconstructed signal.

8. The method of claim 6, wherein one or more of the data layers of the encoded data are generated utilizing an MPEG (Moving Pictures Experts Group) standard audio coder.

9. The method of claim 1, wherein the signal is a video signal or an image signal.

10. The method of claim 9, wherein one or more of the enhancement level reconstructed signals, have more views, or are of higher spatial resolution, than the base level reconstructed signal.

11. The method of claim 9, wherein one or more of the data layers of the encoded data are generated utilizing an MPEG (Moving Pictures Experts Group) standard video coder or a JPEG (Joint Photographic Experts Group) standard image coder.

12. The method of claim 1, wherein an intermediate reconstructed signal is generated from one or more common data layers, and a corresponding reconstruction error is processed in generating one or more of the other data layers.

13. The method of claim 1, wherein the reconstructed signal approximating the signal is at one of three or more quality levels, and is a base level reconstructed signal, or one of two or more enhancement level reconstructed signals.

14. The method of claim 13, wherein the encoded data comprises only one common data layer that is used to generate the base level reconstructed signal and all of the enhancement level reconstructed signals.

15. The method of claim 13, wherein the encoded data comprises one common data layer for each subset of two or more of the three or more quality levels, and wherein the one common data layer is required to generate the reconstructed signal for the subset of two or more of the three or more quality levels.

16. The method of claim 13, wherein the encoded data comprises a number of common data layers that equals the number of enhancement level reconstructed signals, and each of the common data layers required to generate the reconstructed signal at one of the three or more quality levels is also required to generate the signal at every higher one of the three or more quality levels.

17. The method of claim 13, further comprising optimizing the number of common data layers, and the subset of the three or more quality levels for the reconstructed signal that each of the common data layers is required to generate, given signal training data.

18. The method of claim 13, further comprising adapting the number of common data layers, and the subset of the three or more quality levels for the reconstructed signal that each of the common data layers is required to generate, to variation in signal statistics obtained from the signal or from the reconstructed signals.

19. The method of claim 1, wherein the compressing or decompressing step further comprises predicting a current segment of the signal from a previous segment of the reconstructed signal.

20. An apparatus for processing a signal, comprising:
   a processor for compressing, decompressing, or both compressing and decompressing, the signal, wherein the compressing function comprises processing the signal in the processor to generate encoded data, and the decompressing function comprises processing the encoded data in the processor to generate a reconstructed signal approximating the signal at one of two or more quality levels, wherein:
the reconstructed signal is a base level reconstructed signal, or one of one or more enhancement level reconstructed signals;
the base level reconstructed signal approximates the signal at a lowest of the two or more quality levels, and each subsequent one of the one or more enhancement level reconstructed signals approximates the signal at a higher one of the two or more quality levels than the base level reconstructed signal and any preceding one of the enhancement level reconstructed signals;
the encoded data comprises three or more distinct data layers, including:
   a data layer required to generate the reconstructed signal only at a first one of the two or more quality levels,
   a data layer required to generate the reconstructed signal only at a second one of the two or more quality levels which is higher than the first one of the two or more quality levels, and
   a common data layer required to generate the reconstructed signal at the first one of the two or more quality levels and also required to generate the reconstructed signal at the second one of the two or more quality levels.

* * * * *